March 11, 1952      B. FOX      2,588,376

FREQUENCY RESPONSE ANALYSIS

Filed July 3, 1947      2 SHEETS—SHEET 1

INVENTOR.
Benjamin Fox
BY

INVENTOR.
Benjamin Fox
BY

Patented Mar. 11, 1952

2,588,376

UNITED STATES PATENT OFFICE 2,588,376

FREQUENCY RESPONSE ANALYSIS

Benjamin Fox, New York, N. Y.

Application July 3, 1947, Serial No. 758,973

5 Claims. (Cl. 175—183)

(Granted under the act of March 3, 1883, as amended April 30, 1928; 370 O. G. 757)

The invention described herein may be manufactured and used by or for the Government for governmental purposes, without the payment to me of any royalty thereon.

My present invention relates generally to improved means and methods for rapidly determining the amplitude-frequency characteristics of oscillatory systems. More particularly it relates to improved means and methods for measuring and instantly displaying the relationship between the response amplitude of one or more parameters of an oscillatory system as a function of the frequency of the driving force applied thereto.

The most common type of system for this purpose is one in which the frequency of an oscillation generator is swept linearly with respect to time between fixed limits by means of an electronic reactance driven by a saw-tooth wave generator. The varying frequency thus generated is applied to the apparatus under test, the output of which is rectified and applied to the vertical plates of an oscilloscope. The output of the sawtooth generator is also applied to the horizontal time base to deflect the beam horizontally at a linear rate. This system requires that two independent variables vary linearly with respect to time, viz., the horizontal displacement of the oscilloscope beam and the frequency of the oscillator. While the former is easily obtained, the latter is more difficult, since an oscillator whose frequency is easily changed is inherently unstable in frequency. Hence the mean frequency of the oscillator is likely to change with changes in ambient conditions, electrode potentials, etc. In addition, a frequency sweep which is linear at one mean frequency is not necessarily linear at another.

A second type of system for this purpose, which overcomes some of the objections of the system above described, is disclosed in Sherman Patents 2,175,001 and 2,203,750. In this system the output of a signal generator the frequency of which is cyclically varied is applied to the system under test. The output of the system is then rectified and applied to the vertical plates of an oscilloscope. The output of the signal generator is also applied to a frequency discriminator which yields a voltage which is either linearly or logarithmically proportional to the applied frequency. The frequency discriminator output is then amplified and applied to the horizontal plates of the oscilloscope. While this type of system is adequate where the frequency range is small (the system in the Sherman patents, supra, is designed for a range of 20 kilocycles) it is not satisfactory where the frequency range is large, since it is difficult to provide a discriminator having a linear amplitude-frequency characteristic over large frequency ranges.

For instance, video amplifiers such as used in television must be responsive over a range from a few cycles per second to as high as ten megacycles. Video amplifiers for handling pulses in the order of one-tenth microsecond must have a flat frequency response characteristic from a few cycles to ten megacycles, while intermediate frequency amplifiers for handling such pulses must have a band pass of twenty megacycles. To provide frequency discriminators which are linear over such a range is extremely difficult if not impossible.

It is generally the object of my invention to provide an improved system of this type. It is a further object of my invention to provide an improved system of the type disclosed in the Sherman patents, supra, in which the frequency discriminator can be linear over a smaller percentage of frequency variation than that of the varying-frequency signal applied to the apparatus under test. This greatly simplifies the design of the frequency discriminator.

In accordance with one embodiment of my invention the varying frequency signal is generated by means of two oscillators normally tuned to different frequencies, one being fixed and the second being cyclically varied over the required frequency range. The outputs of both oscillators are heterodyned in a mixer to provide a cyclically-varying difference-frequency signal which is applied to the apparatus under test. The varying frequency signal from the second oscillator is also applied to a frequency discriminator, the output of which is used as the abscissa potential of the oscilloscope. In accordance with a modification, the frequencies of both oscillators are cyclically varied in opposite senses and the output of one of the oscillators applied to the discriminator.

For a better understanding of the invention, together with other and further objects thereof, reference is had to the following description taken in connection with the accompanying drawings, wherein like parts are indicated by like reference numerals and wherein.

Figure 1:
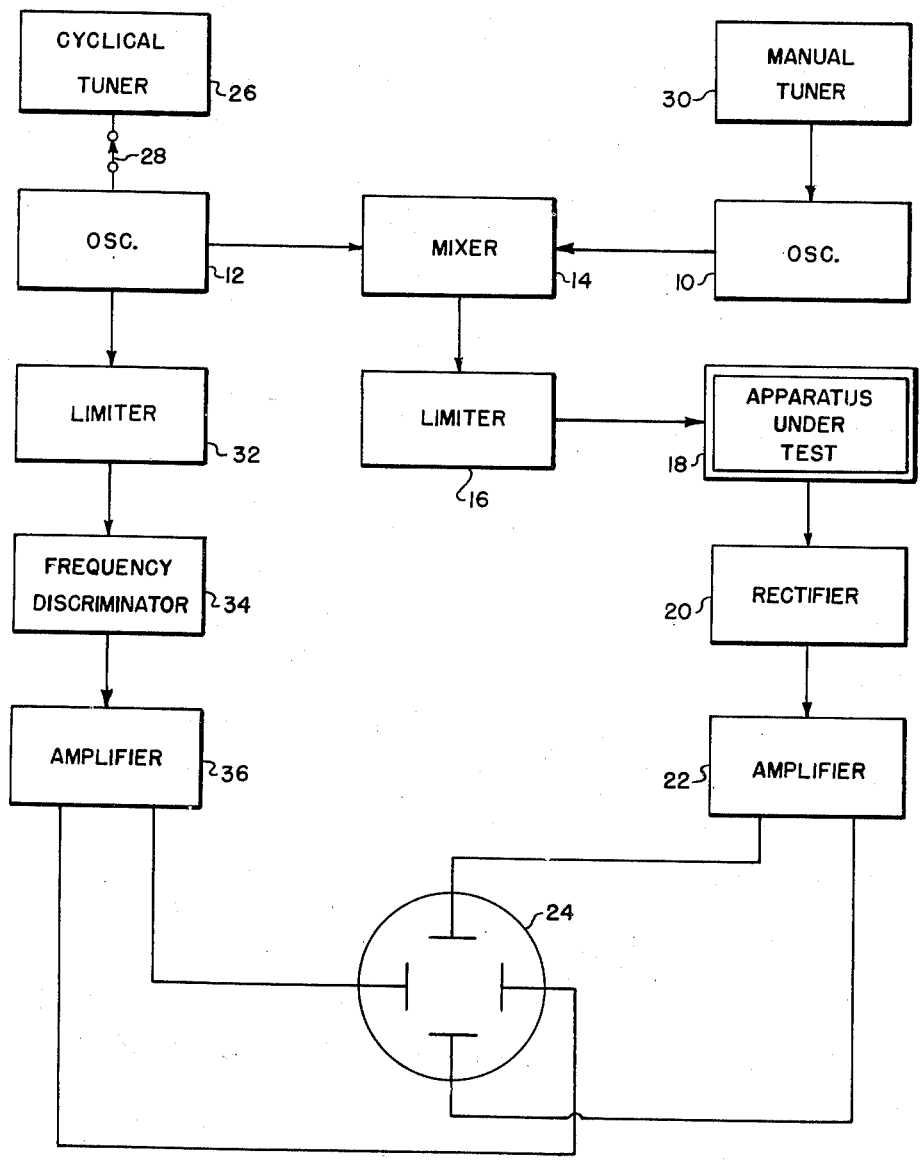
Figure 1 is a block diagram of one embodiment of my invention.

Figure 1 shows a system in which the outputs of an oscillator 10 and an oscillator 12, the frequency of which is cyclically varied, are applied to a mixer 14 which heterodynes the outputs of the oscillators. The mean frequencies of said oscillators may be either the same or different. The difference-frequency output of mixer 14 may be filtered out by a low-pass filter (not shown) and applied through an amplitude limiter 16 to an apparatus 18, the amplitude-frequency characteristic of which is to be observed and measured. The output of apparatus 18 is rectified by a rectifier 20, and the rectified output may be amplified at 22 and applied to the vertical plates of a cathode ray oscilloscope 24 so that the beam thereof will be deflected vertically in accordance with the amplitude of the output of amplifier 22. If amplifier 22 has a linear characteristic, then the vertical deflection will be a linear function of the amplitude of the signals in the output of apparatus 18.

The frequency of the currents applied to apparatus 18 is continuously and cyclically varied by varying the frequency of oscillator 12 over the desired range by any conventional means 26 which may be disconnected by means of a switch 28. The oscillator 10 may be provided with a manually adjustable tuner 30 to vary the mean frequency of the mixer output.

The beam of oscilloscope 24 is also deflected horizontally in proportion to the frequency of the currents applied to apparatus 18. This is done by applying the output of oscillator 12 to an amplitude limiter 32 and then to a frequency discriminator 34 which is tuned to the mean frequency of oscillator 12 and which supplies an output the amplitude of which is proportional to the frequency of the applied input. Discriminator 34 can be of any well known type such as used for detection of frequency-modulated waves. Preferably discriminator 34 is of the balanced type which yields a potential which is zero at its mean frequency, but which varies in magnitude in proportion to the departure of the input from said mean frequency and in polarity in accordance with the direction of said departure.

The output of discriminator 34 may be amplified by an amplifier 36 and applied to the horizontal plates of oscilloscope 24. If frequency discriminator 34 is of the balanced type, then amplifier 36 should preferably be of the balanced, push-pull type, although a single-ended amplifier may also be used.

Thus, the beam of oscilloscope 24 will be horizontally deflected by a voltage proportional to the frequency applied to apparatus 18 to provide an abscissa of the graph presented on the screen of the oscilloscope, while the ordinate is provided by a voltage which is proportional to the amplitude of the output of apparatus 18. If the frequency of the cyclical tuning is made high enough, the frequency of the currents applied to apparatus 18 and discriminator 34 is scanned rapidly enough so as to provide a continuous indication on the screen of the oscilloscope. If it is desired to more closely examine the response of apparatus 18 to a single frequency, switch 28 is opened and tuner 30 adjusted until the desired frequency is obtained in the output of mixer 14, whereby a single point of the screen of the oscilloscope will be illuminated, the ordinate and abscissa, respectively, of said point being dependent upon the amplitude of the output of apparatus 18 and the frequency of the current applied thereto. The ordinate and abscissa on the screen of the oscilloscope can be calibrated directly in terms of amplitude and frequency, respectively.

If amplifiers 22 and 36 are linear, then the ordinate and abscissa graduations on the screen of the oscilloscope will be linearly graduated. By providing in either one or both amplifiers a logarithmic amplification characteristic, the screen of the oscilloscope should be calibrated accordingly.

The frequency of cyclical tuning of oscillator 12 is not critical and can be as low as one cycle or less per second and as high as several hundred cycles or greater. A frequency of sixty cycles per second is suitable and the power line current can be used for this purpose. Where said frequency is low, amplifier 36 should be a direct current amplifier, but an alternating current amplifier can be used for the higher frequencies.

The elements used in tuners 26 and 30 depend, of course, on the type of oscillators used. For oscillators operating in the relatively-low radio-frequency region, mechanically-variable reactances, or reactance tubes may be used. For ultra-high frequencies, Barkhausen-Kurz oscillators, magnetron oscillators, and klystron oscillators may be used. Since the frequency of such oscillators is easily varied by varying the tube electrode potentials, the tuner 30 may be an adjustable source of direct-current voltage, and tuner 26 may be a low-frequency alternating voltage source. It is not absolutely necessary to provide a frequency sweep that varies linearly with time. However, such variation is desirable if a trace of uniform brightness is desired on the oscilloscope screen, and to obtain such result said alternating voltage should be a linear sawtooth wave. However, a sine wave in which the positive and negative peaks are clipped off to provide a wave which is generally trapezoidal in shape may provide a trace which is substantially of uniform brightness, since only the relatively linear components of the sine wave are utilized.

The characteristics and advantages of this system will become apparent by the following illustration of its operation under a particular set of conditions. Assume, for example, that apparatus 18 is an intermediate-frequency amplifier having a mean frequency of fifty megacycles for translating pulse-modulated waves. To observe its response over a frequency range of 50± 10 megacycles, oscillators 10 and 12 may be klystron oscillators tuned to mean frequencies, the difference of which in the output of mixer 14 is fifty megacycles, e. g., 750 and 800 megacycles, respectively. Cyclical tuner 26 will vary the frequency of oscillator 12 over a range of 800 ±10 megacycles. Discriminator 34, excited directly by oscillator 12, will be tuned to a mean frequency of 800 megacycles and provides an output voltage which is linearly proportional to the applied frequency over a range of 800 ±10 megacycles. Discriminators for waves of such frequencies using tuned lines or cavity resonators, are well known.

From the above figures, the advantages of my invention will be obvious. The range of frequency variation of the signals applied to apparatus 18 and discriminator 34 is twenty megacycles. This represents a range of frequency variation of 40% of the mean frequency of the signal applied to apparatus 18, but only 2.5% of the mean frequency of the signal applied to frequency discriminator 34. Obviously, it is considerably easier to provide a linear discriminator for a frequency-variation range of 2.5% than for a range of 40%, even if the latter were possible. Moreover, the percentage of frequency modulation of oscillator 12 is also only 2.5%.

By using even higher mean frequencies in the oscillators 10 and 12, a resultant frequency modulated wave having an even smaller degree of modulation is produced and, hence, a smaller extent of linearity is required in the discriminator.

It is possible to obtain a wave having a smaller degree of frequency modulation without resorting to extremely high mean frequencies. This can be done by frequency dividing the output of oscillator 12 by means of a frequency divider, and then applying the divider output to the discriminator 34, which will, of course, be tuned so that its center frequency is equal to the mean frequency of the output of the frequency divider. If the mean frequency of the divider output is too low because of a high division factor, then said output can be heterodyned with a fixed frequency to provide sum-frequencies which are filtered out, limited and applied to a discriminator having a center frequency equal to the mean sum-frequency. This process of dividing and then heterodyning upward can be carried out in several steps if necessary.

It should be understood that the particular values given in the above example are merely for the purposes of illustrating its operation under a particular set of operating conditions and not in limitation of the invention. Other values may be used, depending upon the frequency ranges required and the particular apparatus to be tested.

Figure 2:
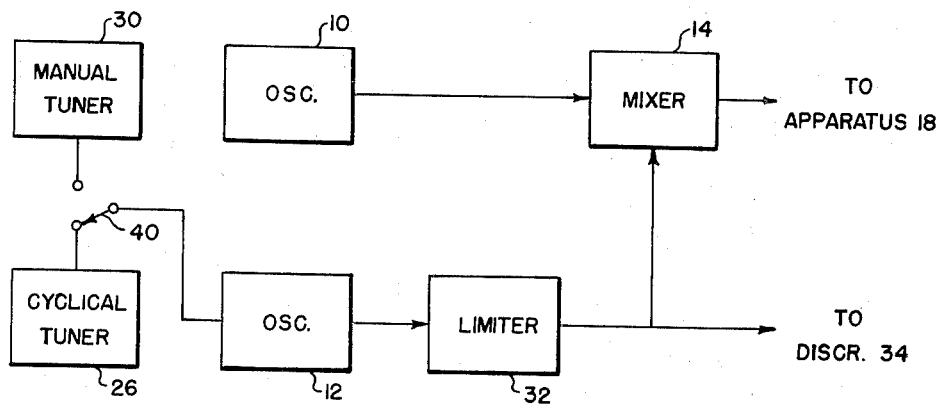
Figures 2 and 3 are block diagrams of modifications of Fig. 1.

Figure 2 illustrates a modification of Fig. 1, which permits the elimination of one of the amplitude limiters. The output of oscillator 12 is applied to amplitude limiter 32 and the output of this limiter is connected in parallel to mixer 14 and discriminator 34. Since both oscillations applied to mixer 14 are now of constant amplitude, the output of said mixer is also of constant amplitude. Another feature illustrated in Fig. 2 is the selective connection of tuners 26 and 30 to oscillator 12 by means of a switch 40. Oscillator 10 can then be left tuned to a fixed frequency.

Figure 3:
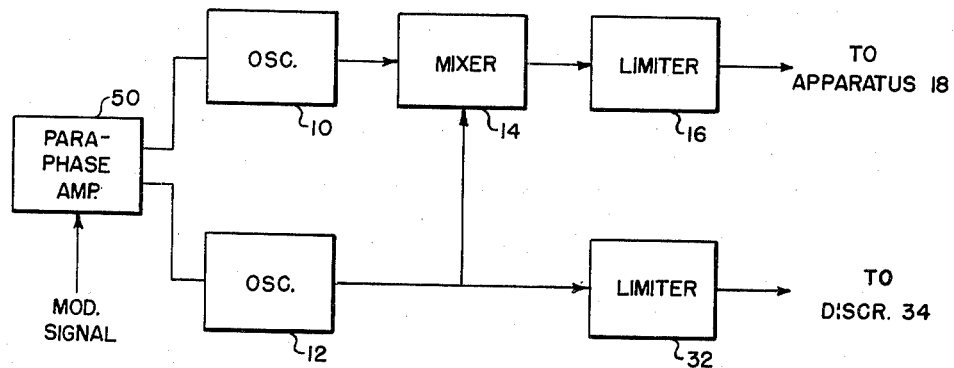

Another modification of my invention, which enables frequency modulation of a wider band is illustrated in Fig. 3, where in both oscillators 10 and 12 are frequency modulated in opposite senses by the push-pull output of a paraphase amplifier 50 which is driven by the low frequency modulation signal. The outputs of both oscillators are heterodyned in mixer 14, and the difference-frequency is filtered out, limited in amplitude at 16, and then applied to the apparatus under test 18. The output of one of the oscillators, in this case, oscillator 12, is also limited in amplitude by limiter 32 and then applied to frequency discriminator 34.

As above pointed out in the Sherman patents, supra, apparatus of the type disclosed therein is not restricted for testing electrical apparatus, but can also be used for testing the frequency characteristics of acoustical, mechanical, and electro-optical systems.

From the above description, it will be seen that my invention essentially comprises simultaneously generating two waves of varying frequency and preferably of constant amplitude, one of said waves having a higher percentage of frequency variation than the other. Even though in the present case the frequency variation band-width (i. e., the extent of frequency deviation) of both waves are equal, the percentages are different because one wave has a higher mean for center frequency than the other. It is not necessary, however, that the extent of frequency deviation of both waves be equal nor that the frequency be varied linearly with time. What is desirable is that the ratio of the instantaneous frequency deviations of both waves be constant, this ratio being unity in the present case.

The wave having the smaller percentage of frequency deviation is applied to a frequency discriminator (i. e., a frequency deviation detector) to develop a voltage which is proportional to the frequency deviation. The other wave is applied to a signal translating circuit, in this case the circuit of which the frequency characteristics are to be tested, and the output of the latter is rectified to develop a voltage proportional to the amplitude thereof. The two voltages may be amplified linearly or logarithmically or in accordance with any other desired function, and then applied to an indicator which provides a composite indicator of the relationship between said voltages.

The composite indicator may be a cathode-ray oscilloscope having orthogonally-related deflecting plates to which the voltages are applied. It is to be understood, however, that other well known types of dual-coordinate indication may be provided, e. g., polar coordinate indication. Well known equivalents of the oscilloscope, such as mirror oscillographs, stroboscopic indicators, etc., may be used.

The various components used herein are well known and need not be described in any further detail. It should be understood that these components will have the usual adjustable parameters. Gain control means are provided in the amplifiers to assure that sufficient voltages will be applied to the deflecting plates of the oscilloscope. Additional amplifiers and/or buffer circuits may be added at any point where such circuits are desirable or necessary. Conventional means (not shown) to adjust the initial position of the oscilloscope beam will be provided. Oscillators 10 and 12 may be tuned to relatively low frequencies which may be multiplied the required amount and then applied to mixer 14.

While there have been described what are at present considered preferred embodiments of the invention, it will be obvious to those skilled in the art that various changes and modifications may be made therein without departing from the invention; and it is aimed in the appended claims to cover all such changes and modifications as fall within the true spirit and scope of the invention.

I claim:

1. Apparatus for testing the frequency response characteristics of an apparatus, comprising means generating a pair of waves, means heterodyning said waves to provide a difference-frequency wave the frequency of which is lower than that of said pair of waves, means for simultaneously modulating the frequency of both of said pair of waves in opposite senses to modulate the frequency of said difference-frequency wave, means for applying said difference-frequency wave to the input of said apparatus, means deriving from the output of said apparatus an energy component having an instantaneous magnitude which is a function of the response of said apparatus to the instantaneous frequency of said difference-frequency wave, frequency discriminator means for deriving solely from one of said pair of waves an energy component having an instantaneous magnitude which is a function of the instantaneous frequency of said one wave, but independent of its rate of frequency variation, and means for indicating each energy component.

2. Apparatus as set forth in claim 1, wherein said indicating means comprises means for generating an indicating beam and a screen, means responsive to one of said energy components for deflecting said beam along one coordinate and means responsive to the other of said energy components for deflecting said beam along a second coordinate.

3. In a system for testing the frequency-response characteristics of an apparatus, means generating a pair of waves, means heterodyning said waves to provide a difference-frequency wave, means for simultaneously modulating the frequency of both of said pair of waves in opposite senses to modulate the frequency of said difference-frequency wave, whereby at least two frequency-modulated waves having different percentages of modulation are generated, means for applying the frequency-modulated wave having the higher percentage of modulation to the input of said apparatus, means for deriving from the output of said apparatus an energy component having an instantaneous magnitude which is a function of the response of said apparatus to the instantaneous frequency of the wave applied thereto, and frequency discriminator means deriving solely from the frequency-modulated wave having the lower percentage of modulation an energy component having an instantaneous magnitude which is dependent upon the instantaneous frequency thereof.

4. In a system for testing the frequency-response characteristics of an apparatus, means generating a pair of waves, means heterodyning said waves to provide a difference-frequency wave, means simultaneously and differentially modulating the frequency of both of said pair of waves to modulate the frequency of said difference-frequency wave, whereby at least two frequency-modulated waves having different percentages of modulation are generated, means for applying the frequency-modulated wave having the higher percentage of modulation to the input of said apparatus, means for deriving from the output of said apparatus an energy component having an instantaneous magnitude which is a function of the response of said apparatus to the instantaneous frequency of the wave applied thereto, and frequency discriminator means for deriving solely from the wave having the lower percentage of modulation an energy component having an instantaneous magnitude which is a function of the instantaneous frequency thereof.

5. In a system for testing the frequency-response characteristics of an apparatus, means generating a pair of waves, means heterodyning said waves to provide a beat-frequency wave, means for simultaneously modulating the frequency of both of said pair of waves to modulate the frequency of said beat-frequency wave, whereby at least two frequency-modulated waves having different perecentages of modulation are generated, means for applying the frequency-modulated wave having the higher percentage of modulation to the input of said apparatus, means for deriving from the output of said apparatus an energy component having an instantaneous magnitude which is a function of the response of said apparatus to the instantaneous frequency of the wave applied thereto, and frequency discriminator means deriving solely from the frequency-modulated wave having the lower percentage of modulation an energy component having an instantaneous magnitude which is dependent upon the instantaneous frequency thereof.

BENJAMIN FOX.

REFERENCES CITED

The following references are of record in the file of this patent:

UNITED STATES PATENTS

| Number | Name | Date |
| --- | --- | --- |
| 2,175,001 | Sherman | Oct. 3, 1939 |
| 2,203,750 | Sherman | June 11, 1940 |
| 2,356,510 | Deserno | Aug. 22, 1944 |
| 2,375,695 | Shapiro | May 8, 1945 |
| 2,387,685 | Sanders | Oct. 23, 1945 |

FOREIGN PATENTS

| Number | Country | Date |
| --- | --- | --- |
| 912,880 | France | May 13, 1946 |

(Corresponding U. S. 2,534,957, Dec. 19, 1950)